United States Patent [19]
Ito

[11] Patent Number: 5,635,650
[45] Date of Patent: Jun. 3, 1997

[54] FLOWMETER HAVING A VIBRATOR THEREIN

[76] Inventor: Yoshihiro Ito, 1620-6, Yoshikawa, Yoshikawa-machi, Kitakatsushika-gun, Saitama 342, Japan

[21] Appl. No.: 428,959

[22] Filed: Apr. 25, 1995

[30] Foreign Application Priority Data

Apr. 26, 1994 [JP] Japan .................................. 6-124791
Apr. 10, 1995 [JP] Japan .................................. 7-084292

[51] Int. Cl.$^6$ .................................................. G01D 1/00
[52] U.S. Cl. ............................................... 73/861.21
[58] Field of Search ........................... 73/861.21, 861.18

[56] References Cited

U.S. PATENT DOCUMENTS

| | | | |
|---|---|---|---|
| 2,078,837 | 4/1937 | Carter | 73/861.21 |
| 3,126,739 | 3/1964 | Whitehill | 73/861.21 |
| 3,605,741 | 9/1971 | Spencer | 73/861.21 |
| 3,885,434 | 5/1975 | Williamson | 73/861.21 |
| 4,358,954 | 11/1982 | De Jong | 73/269 |
| 4,870,859 | 10/1989 | Twerdochlib | 73/203 |

FOREIGN PATENT DOCUMENTS

| | | | |
|---|---|---|---|
| 523282 | 2/1974 | U.S.S.R. | 73/861.21 |
| 441449 | 12/1974 | U.S.S.R. | 73/861.21 |

OTHER PUBLICATIONS

*Flow Measurement Engineering Handbook*; Flowmeter Selection, pp. 6 – 1 through 6 – 9 and 14 – 16 through 14 – 19; 1983.

*Primary Examiner*—George M. Dombroske
*Assistant Examiner*—Paul D. Amrozowicz
*Attorney, Agent, or Firm*—Armstrong, Westerman, Hattori, McLeland & Naughton

[57] ABSTRACT

A measuring unit 12 comprises a vibrator 13 which is disposed in a fluid flowing into the measuring unit 12 and is able to reciprocally vibrate in a direction of width of the flow passage when there occurs a differential pressure due to a flow velocity, a flow separator 15 which is disposed downstream of the vibrator 13 to abut with the vibrator 13 for holding the vibrator 13 in the measuring unit 12 and also separating the fluid, and forms a frequency converter 14 capable of supplying the differential pressure to the vibrator 13 from the upstream side so that the vibrator 13 can reciprocally vibrate, a vibrator abutting portion 16 disposed upstream of the vibrator 13 and coming into abutment with the vibrator 13 when the vibrator 13 is vibrated, and a frequency detector 17 capable of detecting reciprocal frequency of the vibrator 13.

10 Claims, 5 Drawing Sheets

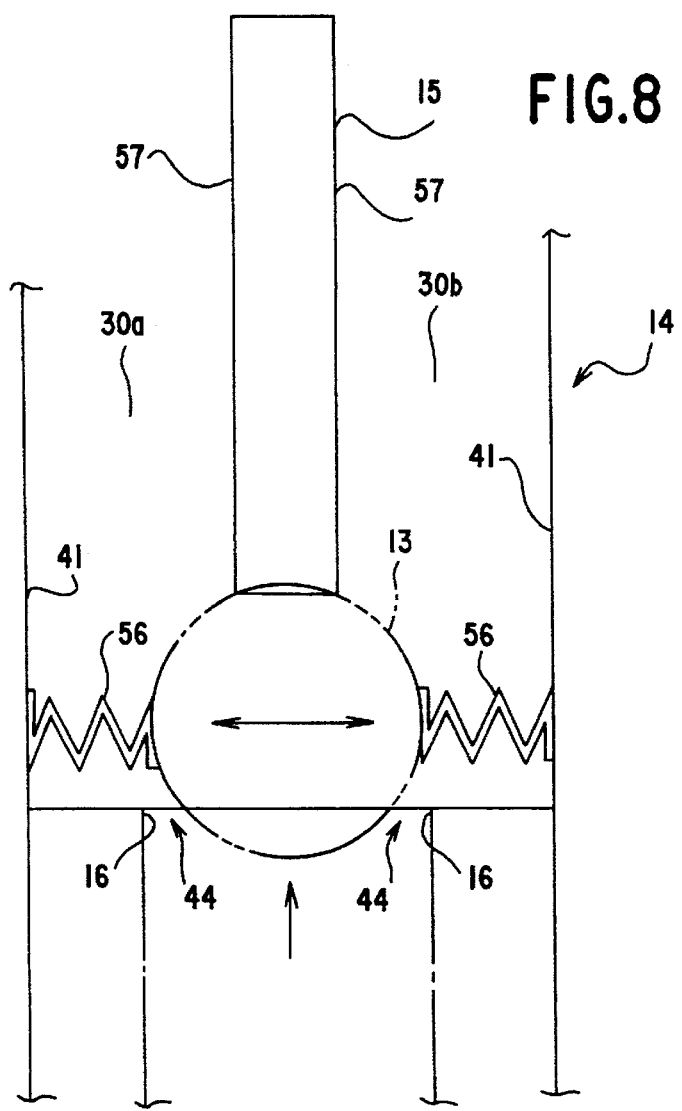
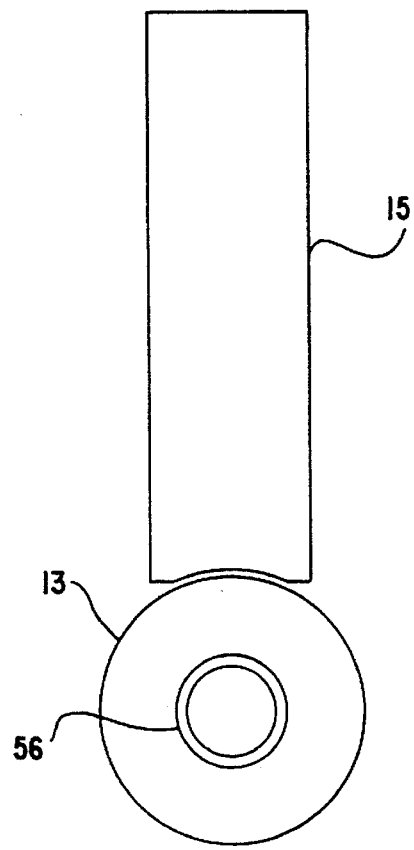
FIG.8
FIG.9

FLOWMETER HAVING A VIBRATOR THEREIN

DESCRIPTION OF BACKGROUND ART AND RELATED ARTS

The present invention relates to a flowmeter, and more particularly to a flowmeter for measuring the flow rate of a fluid by using a vibrator positioned in the fluid to be able to vibrate.

Vortex flowmeters and Differential Producing flowmeters have been heretofore used to measure the flow rate of a fluid.

The vortex flowmeter is based on the principle that, as shown in FIG. 10, if an object 54 is disposed in a flow passage 53 of a fluid, alternate vortices (von Karman's vortices) are generated in two lines along the flow passage on the rear side of the object 54. The flow rate of the fluid is measured by counting the number of the von Karman's vortices.

Specifically, the vortex flowmeter comprises a vortex generating mechanism and a mechanism for detecting vortices generated by the vortex generating mechanism. The number of vortices generated by the vortex generating mechanism in a fluid is detected by a thermistor or a piezoelectric transducer, thereby measuring the flow rate of the fluid.

In such a conventional vortex flowmeter, however, because frequency of the fluid is detected by generating the von Karman's vortices 55, the vortex generating mechanism having a flow passage of width not less than a certain value, i.e., having a predetermined size, is required in order to generate the von Karman's vortices 55. Therefore, the vortex flowmeter cannot have a size smaller than a certain limit. Also, when the flow velocity or flow rate of the fluid is small, the flow rate cannot be measured since it is difficult to generate the von Karman's vortices 55 under such a condition.

Meanwhile, the so-called Differential Producing flowmeters have also been conventionally used in wide fields. The Differential Producing flowmeter includes a throttling mechanism such as an orifice or venturi in a flow passage. The flow rate of a fluid is measured based on a differential pressure produced across the throttling mechanism.

However, such a conventional Differential Producing flowmeter has had shortcomings below. A differential pressure transmitter is required to measure the differential pressure. Further, since the measured flow rate is expressed in the form of a quadratic curve, a flow rate conversion unit including a calculation circuit is required to convert the measured flow rate into a linear value for easier use in subsequent steps. As a result, the production cost is increased.

Also, in the conventional Differential Producing flowmeter, when fluid conditions such as density, pressure and temperature are varied depending on the kind of fluid to be measured, calculations for compensating measured values are required, making it troublesome to perform the measurement work.

OBJECTS AND SUMMARY OF THE INVENTION

A main object of the present invention is therefore to provide a small-sized flowmeter for detecting frequency of a vibrator positioned in a fluid to be able to vibrate depending on the flow velocity and detecting the flow rate of the fluid, which can be manufactured at a reduced cost, can measure the flow rate of the fluid even when the flow velocity or flow rate thereof is small, and can measure the volumetric flow rate of the fluid regardless of changes in conditions, such as density, pressure and temperature, of the fluid to be measured.

Another object of the present invention is to provide a flowmeter in which the frictional resistance caused by contact between a flow separator and the vibrator is reduced and, when a differential pressure is developed across the vibrator in the fluid, the differential pressure is converted into vibratory energy with good efficiency.

Still another object of the present invention is to provide a flowmeter in which the vibrator is restricted in its vibrating direction, enabling measurement accuracy to be improved.

Still another object of the present invention is to provide a flowmeter in which the vibrator positively blocks off a flow of the fluid to develop the differential pressure, enabling the measurement to be made with higher accuracy.

Still another object of the present invention is to positively vibrate the vibrator.

Still another object of the present invention is to provide a flowmeter which can be manufactured at a further reduced cost.

Still another object of the present invention is to provide a flowmeter in which the vibrator can be positively vibrated to achieve the measurement with higher accuracy.

Still another object of the present invention is to provide a flowmeter which can control not only the amplitude of frequency of the vibrator, but also collision forces produced when the vibrator collides against a vibrator abutting portion.

Still another object of the present invention is to provide a flowmeter which requires neither a differential pressure transmitter nor a calculation circuit for converting a flow rate value representing the differential pressure in the form of a quadratic curve into a linear signal, which can be manufactured at a reduced cost, and which can measure the volumetric flow rate of the fluid regardless of changes in conditions, such as density, pressure and temperature, of the fluid to be measured.

To achieve the above objects, a flowmeter of the present invention comprises a flow passage 11 through which a fluid to be measured flows, and a measuring unit 12 disposed in the flow passage 11 for measuring the flow rate of the fluid, the measuring unit 12 comprising a vibrator 13 positioned in the fluid flowing into the measuring unit 12 and being able to reciprocally vibrate in a direction of width of the flow passage when there occurs a differential pressure due to a flow velocity, a flow separator 15 disposed downstream of the vibrator 13 to abut with the vibrator 13 for holding the vibrator 13 in the measuring unit 12 and also separating the fluid, and forming a frequency converter 14 capable of supplying the pressure of the fluid to the vibrator 13 from the upstream side so that the vibrator 13 can reciprocally vibrate, a vibrator abutting portion 16 disposed upstream of the vibrator 13 and coming into abutment with the vibrator 13 when the vibrator 13 is vibrated, and a frequency detector 17 capable of detecting reciprocal frequency of the vibrator 13, the flow separator 15 being disposed to divide the interior of the measuring unit 12 for defining a pair of cavities 30a, 30b side by side in the direction of width of the flow passage 11, the pair of cavities 30a, 30b making up the frequency converter 14, the vibrator 13 being reciprocally vibrated upstream of the pair of cavities 30a, 30b in the direction of width of the flow passage 11, the reciprocal frequency of the vibrator 13 being detected by the frequency detector 17 to detect the flow rate of the fluid.

In the flowmeter of the present invention, the vibrator 13 is formed to be spherical.

In the flowmeter of the present invention, in addition to the technical features according to Claims 1 and 2, the flow separator 15 has guides 20, 20 for restricting the reciprocal frequency of the vibrator 13 in the direction of width of the flow passage 11 to a certain direction.

In the flowmeter of the present invention, the measuring unit 12 comprises a measuring unit body 58 and an inlet passage 21 through which the fluid flows into the measuring unit body 58, the inlet passage 21 is formed to have a smaller diameter than that of a cavity defined in the measuring unit body 58, and the vibrator abutting portion 16 is formed by an edge of an inner circumferential surface 43 defining the inlet passage 21.

In the flowmeter of the present invention, the vibrator 13 is formed to have a diameter not only larger than a spacing L3 between the flow separator 15 and the inner wall surface 41 of the flow passage in the measuring unit 12, but also larger than an inner diameter L of the inlet passage 21.

In the flowmeter of the present invention, the flow separator 15 is formed of a plate-like member and is disposed to extend in a direction in which the fluid flows through the flow passage 11 such that the flow passage 11 is almost evenly divided into two parts in the direction of width of the flow passage 11, and the vibrator 13 is arranged to reciprocally vibrate in a direction of thickness of the plate-like member.

In the flowmeter of the present invention, the frequency detector 17 comprises a proximity sensor.

In the flowmeter of the present invention, the flow passage 11 is formed to be circular in cross-section.

In the flowmeter of the present invention, the vibrator 13 is supported by supports 56 each of which has a supporting force smaller than the force imposed by the flow velocity of the fluid.

Also to achieve the above objects, a flowmeter of the present invention is adapted for a structure comprising a main flow passage through which a fluid to be measured flows, a throttle mechanism disposed in the main flow passage, and a bypass for communicating the upstream and downstream sides of the throttle mechanism with each other, the flowmeter being disposed in the bypass and having a measuring section for measuring the differential pressure across the throttle mechanism, to thereby measure the flow rate of the fluid, the measuring section including a measuring unit 12 into which the fluid upstream of the throttle mechanism is introduced for measuring the flow rate of the fluid, the measuring unit 12 comprising a vibrator 13 positioned in the fluid flowing into the measuring unit 12 and being able to reciprocally vibrate in a direction of width of the flow passage when there occurs a differential pressure due to a flow velocity, a flow separator 15 disposed downstream of the vibrator 13 to abut with the vibrator 13 for holding the vibrator 13 in the measuring unit 12 and also separating the fluid, and forming a frequency converter 14 capable of supplying the differential pressure generated by a throttle in the main flow passage to the vibrator 13 from the upstream side so that the vibrator 13 can reciprocally vibrate, a vibrator abutting portion 16 disposed upstream of the vibrator 13 and coming into abutment with the vibrator 13 when the vibrator 13 is vibrated, and a frequency detector 17 capable of detecting reciprocal frequency of the vibrator 13, the flow separator 15 being disposed to divide the interior of the measuring unit 12 for defining a pair of cavities 30a, 30b side by side in the direction of width of the flow passage 11, the pair of cavities 30a, 30b making up the frequency converter 14, the vibrator being reciprocally vibrated upstream of the pair of cavities 30a, 30b in the direction of width of the flow passage 11, the reciprocal frequency of the vibrator 13 being detected by the frequency detector 17 to detect the flow rate of the fluid.

In the present invention, when the fluid flows into the flow passage 11, the vibrator 13 is positioned in the fluid while being supported by the fluid separator 15 at its upstream side in the measuring unit 12.

At the time the fluid flows through the flow passage 11, there occurs a difference in flow velocity between an area closer to the inner wall surface of the flow passage and an area at the center of the flow passage. With this difference in flow velocity in the direction of width of the flow passage 11, uneven forces act on the vibrator 13 from the upstream side.

Because of such uneven flow speeds, the vibrator 13 is moved to a position upstream of one of the cavities 30a and 30b which are defined by the flow separator 15 and make up the frequency converter 14, coming into abutment with the vibrator abutting portion 16.

At this time, since the flow of the fluid approaching the cavity 30a, to which the vibrator 13 has moved, from the upstream side is blocked off by the vibrator 13, the fluid has difficulty flowing into the cavity 30a to which the vibrator 13 has moved, and most of the fluid coming from the upstream side flows into the other cavity 30b.

Accordingly, the flow velocity of the fluid in the cavity 30a, i.e., the side to which the vibrator 13 has come closer, is quickly dropped.

On the other hand, the fluid flowing into the cavity 30b, i.e., the side from which the vibrator 13 has moved away, flows through a narrow gap 44 defined between the vibrator 13 and the vibrator abutting portion 16.

Because a fluid passage area of the narrow gap 44 defined between the vibrator 13 and the vibrator abutting portion 16 is smaller than a cross-sectional area of the inlet passage 21, a large differential pressure is developed between the upstream inlet passage 21 and the downstream cavity 30b with the gap 44 therebetween.

In this case, therefore, a large differential pressure is also developed between the cavity 30a to which the vibrator 13 has moved and the other cavity 30b with the fluid separator 15 therebetween.

Under the thus-developed differential pressure combined with an action of inertial force, the vibrator 13 starts moving toward the cavity 30b which is subject to a lower pressure.

Then, the vibrator 13 moves to the cavity 30b. Now, conversely to the above, the flow velocity of the fluid in the cavity 30b, i.e., the side to which the vibrator 13 has come closer, is quickly dropped.

On the other hand, the fluid flowing into the cavity 30a, i.e., the side from which the vibrator 13 has moved away, flows through a narrow gap 44 defined between the vibrator 13 and the vibrator abutting portion 16.

Because a fluid passage area of the narrow gap 44 defined between the vibrator 13 and the vibrator abutting portion 16 is smaller than a cross-sectional area of the inlet passage 21, a large differential pressure is developed between the upstream inlet passage 21 and the downstream cavity 30a with the gap 44 therebetween.

In this case, therefore, a large differential pressure is also developed between the cavity 30b to which the vibrator 13 has moved and the other cavity 30a with the fluid separator 15 therebetween.

Under the thus-developed differential pressure combined with an action of inertial force, the vibrator 13 starts moving toward the cavity 30a which is subject to a lower pressure.

In the above reciprocating process of the vibrator 13, though also depending on changes in the pressure just after the vibrator 13, the vibrator 13 is positively reciprocated by the pressure transmission from one cavity to the other cavity through a downstream end 45 of the flow separator 15 having a predetermined length.

When the fluid is flowing through the flow passage 11, the vibrator 13 repeats the above operation. Thus, the vibrator 13 reciprocally vibrates with a predetermined amplitude between positions upstream of the pair of cavities 30a, 30b defined by the flow separator 15, while the vibrator 13 is held in abutment with the flow separator 15. The reciprocal frequency of the vibrator 13 is detected by the frequency detector 17.

The larger the flow rate of the fluid flowing into the flowmeter from the inlet passage 21, the higher is the differential pressure of the fluid flowing into the cavity 30a or 30b through the gap 44. As the differential pressure increases, a larger force acts on the vibrator 13.

The number of vibrations of the vibrator 13 has such a characteristic that the second power thereof is proportional to force. On the other hand, the differential pressure (force) has such a characteristic that the ½ power thereof is proportional to the flow velocity. Because the number of frequency is related to the flow velocity by extracting the square root of the squared value, the former is eventually expressed by a linear function of the latter, i.e., the number of frequency is proportional to the flow velocity (flow rate). Therefore, by detecting the number of vibrations of the vibrator 13 by the frequency detector 17, the volumetric flow rate of the fluid can be detected with no need of calculations for compensation regardless of conditions, such as density, pressure and temperature, of the fluid.

In the present invention, the spherical vibrator 13 is reciprocally vibrated in the measuring unit 12.

In the present invention, the vibrator 13 is reciprocally vibrated in the direction of width of the flow passage while being restricted by the guides 20, 20 formed as part of the flow separator 15 so as to vibrate in the certain direction.

In the present Invention, the spherical vibrator 13 vibrates while intermittently abutting the vibrator abutting portion 16 formed by the edge of the inner circumferential surface 43 defining the inlet passage 21.

In the present invention, when there is no flow velocity, the vibrator 13 is positioned within the vibrator abutting portion 16 without dropping to the upstream side. When the vibrator 13 is vibrating, it alternately closes the pair of cavities 30a, 30b at the upstream side.

In the present invention, the flow passage 11 is divided by the flow separator 15 in the form of a plate-like into two parts in the direction of passage width, so that the two cavities 30a, 30b are defined in the flow passage.

In the present invention, the vibrator 13 is vibrated in the measuring unit 12 and, when the vibrator 13 comes closer to the vibrator abutting portion 16, the proximity sensor 17 detects the frequency. In the present invention, the fluid flows through the flow passage 11 which is formed to be circular in cross-section.

In the present invention, the vibrator 13 is vibrated while being supported by the supports 56. In the present invention, it is also possible to measure the flow rate based on the number of vibrations in a Differential Producing flowmeter.

Accordingly, in the present invention, since the flow rate of the fluid is detected by detecting the number of vibrations of the vibrator 13 positioned in the fluid to be able to vibrate, the flowmeter can be made smaller as a whole can be manufactured at a lower cost than the conventional vortex flowmeter.

In the present invention, since the vibrator 13 is directly positioned in the flow passage 11 to measure the flow rate of the fluid, it is possible to facilitate the measurement and also to easily measure the fluid flowing at a small flow velocity or rate for which the conventional vortex flowmeter has had a difficulty in measuring it.

Further, the flowmeter of the present invention requires no compensation even when there occur changes in conditions, such as density, pressure and temperature, of the fluid to be measured, as with the conventional vortex flowmeter. Thus, the volumetric flow rate of the fluid can be detected regardless of changes in conditions, such as density, pressure and temperature, of the fluid.

Accordingly, there can be provided a flowmeter which has a small size, can be manufactured at a reduced cost, is easy to carry, and has no limitations depending the kind of fluid to be measured and conditions of the fluid.

Moreover, the present invention provides a flowmeter in which the frictional resistance caused by contact between the flow separator 15 and the vibrator 13 is reduced and, the energy created upon a differential pressure being generated in the fluid is converted into frequency with good efficiency.

In the present invention, the vibrator 13 is restricted in its vibrating direction, enabling measurement accuracy to be improved.

In the present invention, the vibrator 13 positively blocks off the flow of the fluid to develop the differential pressure enabling the measurement to be made with higher accuracy.

In the present invention, the vibrator 13 is positively vibrated to ensure the highly accurate measurement.

In the present invention, there is provided a flowmeter which can be manufactured at a reduced cost. In the present invention, the vibrator 13 can be more positively vibrated to achieve the measurement with higher accuracy. In the present invention, it is possible not only to control the amplitude of frequency of the vibrator 18, but also to effectively prevent a wear of the vibrator abutting portion 16 caused due to collision forces that are produced when the vibrator 18 collides against the vibrator abutting portion 16.

Furthermore, the flowmeter of the present invention requires neither a differential pressure transmitter which has been used in the conventional Differential Producing flowmeter, nor a calculation circuit necessary to perform calculations for converting the differential pressure into a linear value and calculations for compensations needed upon changes in conditions of the fluid to be measured and the environment for the measurement. As a result, the production cost of the Differential Producing flowmeter can be reduced.

Additionally, unlike the conventional simple Differential Producing flowmeter, the flowmeter of the present invention requires no compensation even when conditions, such as density, pressure and temperature, of the fluid to be measured is varied, and can measure the volumetric flow rate of the fluid regardless of changes in conditions, such as density, pressure and temperature, of the fluid.

BRIEF DESCRIPTION OF THE DRAWINGS

FIG. 8 is a side view of another embodiment of the flowmeter according to the present invention, the view showing a state that a vibrator is supported by supports.

FIG. 9 is a side view of another embodiment of the flowmeter according to the present invention, the view showing the state that the vibrator is supported by the supports.

DETAILED DESCRIPTION OF PREFERRED EMBODIMENTS

The present invention will be described below in detail with reference to embodiments illustrated in the accompanying drawings.

Figure 1:
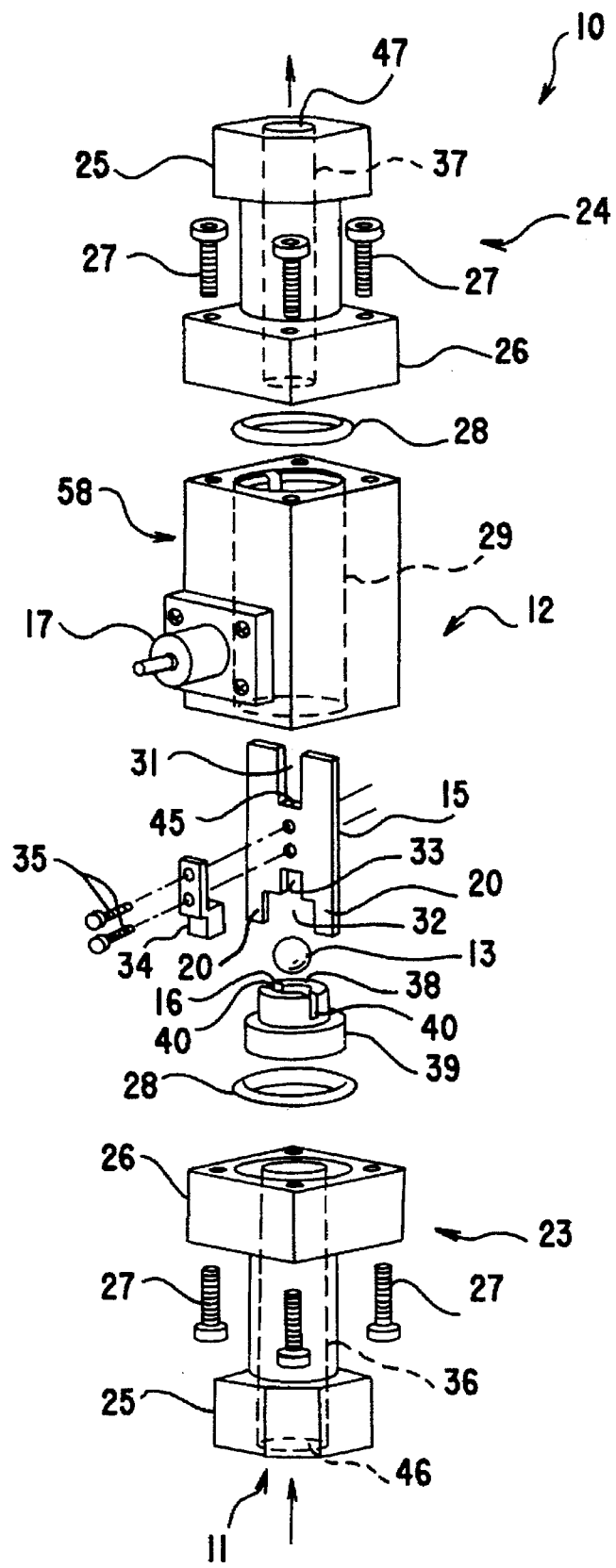
FIG. 1 is an exploded perspective view showing one embodiment of a flowmeter according to the present invention.

As shown in FIG. 1, a flowmeter 10 according to this embodiment is formed of a tubular member made of stainless steel and being entirely hollow. The flowmeter 10 comprises an inlet unit 23 having a cavity 36 being circular in cross-section through which a fluid flows into the flowmeter, a measuring unit 12 fixedly connected to the inlet unit 23, and an outlet unit 24 fixedly connected to the measuring unit 12 from the downstream side and having a cavity 37 being circular in section through which the fluid flows out of the flowmeter.

The inlet unit 23 and the outlet unit 24 are each formed of a pipe-like member provided with flanges 25, 26 at its axially opposite ends, and the measuring unit 12 is formed of a rectangular parallelepiped member having a cylindrical cavity 29 which is defined therein to extend in the longitudinal direction and have a truly circular cross-section.

The downstream flange 26 of the inlet unit 23 and the upstream flange 26 of the outlet unit 24 are each formed to be square in cross-section and can be fixedly connected to the measuring unit 12 by bolts 27 through an O-ring 28. Therefore, the cavity 36 of the inlet unit 23, the cavity 37 of the outlet unit 24, and the cylindrical cavity 29 of the measuring unit 12 are interconnected to define a flow passage 11 which penetrates the flowmeter in the axial direction and has openings 46, 47 at its axial opposite ends so that a fluid flows therethrough.

Figure 2:
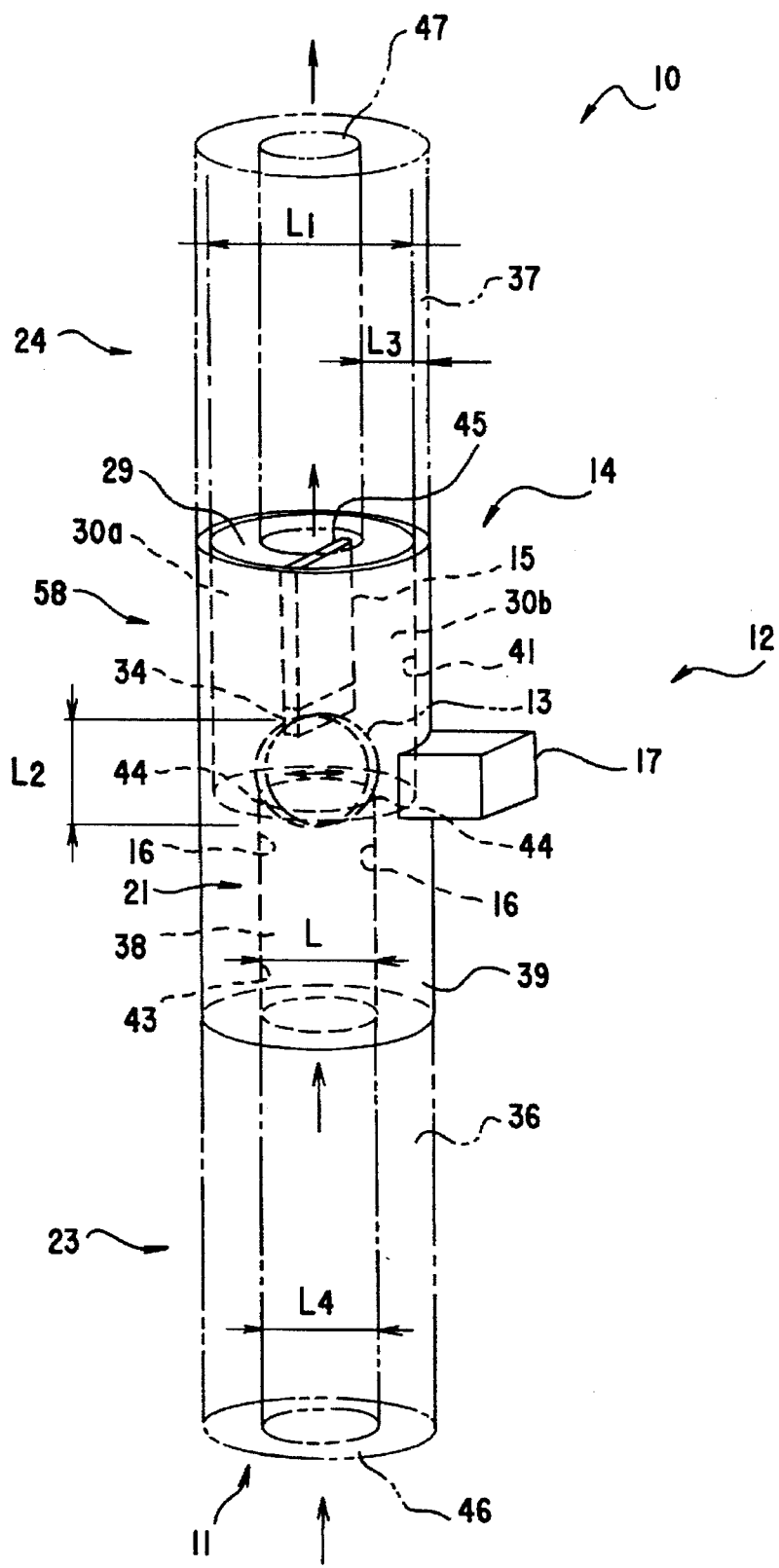
FIG. 2 is a conceptual view showing one embodiment of the flowmeter according to the present invention.

As shown in FIG. 2, the measuring unit 12 comprises a measuring unit body 58 and an inlet passage 21 through which a fluid flows into the measuring unit body 58. The measuring unit body 58 comprises a vibrator 13 which floats in the fluid flowing into the measuring unit 12 and is able to reciprocally vibrate in a direction of the passage width (or a certain direction in a plane perpendicular to the direction in which the fluid flows through the flow passage 11) when there occurs a differential pressure, a flow separator 15 which is disposed downstream of the vibrator 13 to abut with the vibrator 13 for holding the vibrator 13 in the measuring unit 12 and also separating the fluid, the flow separator providing a frequency converter 14 capable of supplying a differential pressure to the vibrator 13 from the upstream side so that the vibrator 13 can reciprocally vibrate, a vibrator abutting portion 16 disposed upstream of the vibrator 13 and coming into abutment with the vibrator 13 when the vibrator 13 is vibrated, and a frequency detector 17 capable of detecting reciprocal frequency of the vibrator 13.

As seen from FIG. 1, the vibrator 13 floating in the fluid flowing into the measuring unit 12 is disposed in the cylindrical cavity 29 of the measuring unit 12. The vibrator 13 is formed to have a spherical shape in the illustrated embodiment.

The flow separator 15 having its lower end which comes into abutment with the vibrator 13 to hold the vibrator 3 in the measuring unit 12 and also separate the fluid is disposed in the cavity 29 downstream of the vibrator 13.

In this embodiment, the flow separator 15 is formed of a plate-like member and is disposed to extend in the direction of the flow passage such that the cavity 29 defining the flow passage 11 is almost evenly divided into two parts in a direction of the passage width. The flow separator 15 has a slit 31 which is formed in its downstream end portion at the middle in a direction of the plate width and has predetermined length and a predetermined width.

The flow separator 1S also has a cutout 32 formed in its upstream end portion. Further, a recess 33 is formed at the middle of the cutout 32. The cutout 32 serves to form a pair of guides 20, 20 for the vibrator 13.

The pair of guides 20, 20 restricts the vibrator 13 to vibrate in a direction of thickness of the flow separator 15, i.e., in a direction perpendicular to flow separating surfaces 57.

A vibrator stop 34 is fixed by screws 35, 35 so as to locate in the recess 33. The vibrator stop 34 abuts with the vibrator 13 at its downstream side through a point contact at all times when there is a flow velocity, and also supports the vibrator 13 from the downstream side in such a manner as allowing the vibrator 13 to reciprocally vibrate in the direction of width of the flow passage 11 when the fluid is flowing into the flowmeter.

Further, as shown in FIG. 2, the flow separator 15 is disposed so as to almost evenly divide the cavity 29 defining the flow passage 11 into two parts in the direction of the passage width. A pair of cavities 30a, 30b are defined on both sides of the flow separator 15. These paired cavities 30a, 30b make up the frequency converter 14.

The frequency converter 14 is arranged to supply a differential pressure to the vibrator 13 from the upstream side so that the vibrator 13 can reciprocally vibrate in the direction of width of the flow passage 11 and in the direction perpendicular to the flow separating surfaces 57 of the flow separator 15.

On the other hand, as shown in FIGS. 1 and 2, the flow separator 1S is fixedly disposed in the cavity 29 downstream of the vibrator 13.

There is also disposed a flow separator fixing member 39 which supports the vibrator 13 from the upstream side when the fluid is not flowing into the flowmeter, and has a vibrator abutting portion 16 which comes into abutment with a lower portion of the vibrator 13 when the fluid is flowing into the flowmeter and the vibrator 13 is vibrated under the fluid pressure.

The flow separator fixing member 39 is configured such that it is fixedly inserted to a lower end portion of the cavity 29 of the measuring unit body 58 and holds the vibrator 13, while the fluid separator 15 is fixed to it.

The flow separator fixing member 39 is formed to be convex in cross-section, and has a cylindrical cavity 38 formed therein to penetrate the member 39 in the vertical direction and define a fluid passage 21. The cavity 38 serves to define the aforementioned inlet passage 21 for communication with the measuring unit body 58.

A diameter L of the inlet passage 21 is set to be smaller than a diameter L1 of the cylindrical cavity 29. Also, in this embodiment, the diameter L of the inlet passage 21 is set to be equal to a diameter L4 of the cylindrical cavity 36 defined in the inlet unit 23.

Therefore, when the flow separator fixing member 39 is fixed in the cavity 29, the inlet passage 21 of the flow separator fixing member 39 and the cavity 29 of the measuring unit body 58 jointly define the flow passage 11 which is continuously communicated with the cavity 36 of the inlet unit 23 and the cavity 37 of the outlet unit 24.

As shown in FIG. 1, the flow separator fixing member 39 has a pair of slits 40, 40 formed in its upper end portion to face diametrically each other. Tip ends of the pair of guides 20, 20 formed in the upstream end portion of the flow separator 1S are fixedly fitted in the pair of slits 40, 40, respectively, whereby the flow separator 15 is attached to the flow separator fixing member 39.

Further, as shown in FIG. 2, a diameter L2 of the vibrator 13 is set to be larger than a diameter L of the cavity 38 defined in the flow separator fixing member 39, and is also set to be larger than a spacing L3 between the flow separator 15 and an Inner wall surface 41 of the cavity 29.

Additionally, the illustrated embodiment is dimensioned such that the diameter of the vibrator 13 is 9.5 mm, the inner diameter of the inlet passage 21 is 9 mm, and the inner diameter of the frequency converter 14 is 18 mm.

As shown in FIGS. 1 and 2, a proximity sensor 17 as the frequency detector is disposed on the outer side of the measuring unit 12 at the same level as where the vibrator 13 is disposed in the cavity 29 of the measuring unit 12. The proximity sensor 17 is designed to be sensitive to approaching of the vibrator 13 for detecting frequency thereof when the fluid is flowing through the flow passage 11 and the vibrator 13 reciprocally vibrates in the direction of width of the flow passage 11 and in the direction perpendicular to the flow separating surfaces 57.

Operation of the flowmeter 10 according to this embodiment will be described below.

When using the flowmeter 10 of this embodiment, a fluid to be measured is introduced by appropriate means to flow into the flowmeter through the opening 46 of the inlet unit 23.

When the fluid flows into the flow passage 11, the vibrator 13 is caused to float in the fluid while being supported by the fluid separator 15 at its downstream side in the measuring unit 12.

At the time the fluid flows through the cavity 36 and the inlet passage 21 both defining the flow passage 11, there occurs a difference in flow velocity between an area closer to an inner circumferential surface 43 of the flow passage 11 and an area at the center of the flow passage 11. With this difference in flow velocity In the direction of width of the flow passage 11, uneven forces act on the vibrator 13 from the downstream side.

Because of such uneven flow speeds, the vibrator 13 is moved to a position upstream of one of the cavities 30a and 30b which are defined by the flow separator 15 and make up the frequency converter 14, coming into abutment with the vibrator abutting portion 16.

At this time, since the flow of the fluid approaching the cavity 30a, to which the vibrator 13 has moved, from the upstream side is substantially blocked off by the vibrator 13, the fluid has difficulty flowing into the cavity 30a to which the vibrator 13 has moved, and most of the fluid coming from the upstream side flows Into the other cavity 30b.

Accordingly, the flow velocity of the fluid in the cavity 30a, i.e., the side to which the vibrator 13 has come closer, is quickly dropped.

On the other hand, the fluid flowing into the cavity 30b, i.e., the side from which the vibrator 13 has moved away, flows through a narrow gap 44 defined between the vibrator 13 and the vibrator abutting portion 16.

Because a fluid passage area of the narrow gap 44 defined between the vibrator 13 and the vibrator abutting portion 16 is smaller than a cross-sectional area of the inlet passage 21, a large differential pressure is developed between the upstream inlet passage 21 and the downstream cavity 30b with the gap 44 therebetween.

In this case, therefore, a large differential pressure is also developed between the cavity 30a to which the vibrator 13 has moved and the other cavity 30b with the fluid separator 15 therebetween.

Under the thus-developed differential pressure combined with an action of inertial force, the vibrator 13 starts moving toward the cavity 30b which is subject to a lower pressure.

When the vibrator 13 starts moving toward the cavity 30b and a maximum value of the flow velocity in the cavity 30b reaches a downstream end 45 of the slit 31 formed in the flow separator 15, an even higher instantaneous differential pressure is transmitted between the cavity 30a to which the vibrator 13 has moved and the other cavity 30b, causing the flow velocity of the fluid to rise in the cavity 30a.

Then, conversely to the above, the flow velocity of the fluid in the cavity 30b, i.e., the side to which the vibrator 13 has come closer, is quickly dropped. On the other hand, the fluid flowing into the cavity 30a, i.e., the side from which the vibrator 13 has moved away, flows through a narrow gap 44 defined between the vibrator 13 and the vibrator abutting portion 16.

Because a fluid passage area of the narrow gap 44 defined between the vibrator 13 and the vibrator abutting portion 16 is smaller than a cross-sectional area of the inlet passage 21, a large differential pressure is developed between the upstream inlet passage 21 and the downstream cavity 30a with the gap 44 therebetween.

In this case, therefore, a large differential pressure is also developed between the cavity 30b to which the vibrator 13 has moved and the other cavity 30a with the fluid separator 15 therebetween.

Under the thus-developed differential pressure combined with an action of inertial force, the vibrator 13 starts moving toward the cavity 30a which is subject to a lower pressure.

When a maximum value of the flow velocity in the cavity 30a reaches the downstream end 45 of the slit 31 formed in the flow separator 15, an even higher instantaneous differential pressure is transmitted between the cavity 30b to which the vibrator 13 has moved and the other cavity 30a, causing the flow velocity of the fluid to rise again in the cavity 30b.

In the above reciprocating process of the vibrator 13, though also depending on changes in the pressure just after the vibrator 13, the vibrator 13 is positively reciprocated by the pressure transmission through the downstream end 45 of the flow separator 15 having a predetermined length.

In this embodiment, as described above, the provision of the pair of guides 20, 20 ensures that the vibrator 13 vibrates in the direction perpendicular to the flow separating surfaces 57 of the flow separator 15 while being restricted on both sides thereof.

When the fluid is flowing through the flow passage 11, the vibrator 13 repeats the above operation. Thus, the vibrator 13 reciprocally vibrates with a predetermined amplitude within the vibrator abutting portion 16 upstream of the pair of cavities 30a, 30b defined by the flow separator 15 in the direction perpendicular to the flow of the fluid flowing through the flow passage 11 and in the direction of thickness of the flow separator 15 in the form of a plate, while the vibrator 13 is held in point contact with the vibrator stop 34 provided on the flow separator 15 and is restricted by the guides 20, 20 of the flow separator 15 so as to vibrate in the direction perpendicular to the flow separating surfaces 57.

In the illustrated embodiment, the frequency width of the vibrator 13 is about 0.7 mm.

Further, in this embodiment, the proximity sensor 17 is disposed in the measuring unit 12 and detects the vibrator 13 at the time the vibrator 13 comes closer to the vibrator abutting portion 16 of the flow separator fixing member 39 disposed in the measuring unit 12. Accordingly, the number of vibrations of the vibrator 13 can be measured by the proximity sensor 17.

The larger the flow rate of the fluid flowing into the frequency converter 14 from the inlet passage 21, the higher is the differential pressure of the fluid flowing into the cavity 30a or 30b through the gap 44.

Also, the smaller the flow rate of the fluid flowing into the frequency converter 14 from the inlet passage 21, the lower is the differential pressure of the fluid flowing into the cavity 30a or 30b through the gap 44.

Further, as the differential pressure acting on the vibrator 13 rises, the speed of the vibrator 13 moving in the direction of the passage width is increased, and as the differential pressure acting on the vibrator 13 lowers, the moving speed of the vibrator 13 is reduced.

As a result, the flow rate of the fluid is in proportion to the number of vibrations of the vibrator 13, and hence it can be measured by detecting the number of vibrations of the vibrator 13 by the frequency detector 17.

In the flowmeter 10 according to this embodiment, since the vibrator 13 is formed to have a spherical shape, the frictional resistance between the vibrator 13 and the vibrator stop 34 provided on the flow separator 15 is very small. Therefore, the energy produced by the differential pressure can be efficiently transmitted to the vibrator 13 and the flow rate can be measured with high accuracy.

With the provision of the guides 20, 20 serving to restrict the vibrator 13 so as to reciprocally vibrate in a certain direction, the flow passage area of the fluid is always kept constant during the repeated frequency of the vibrator 13 and the flow rate can be measured with higher accuracy.

Also, in the flowmeter 10 according to this embodiment, since the frequency detector 17 comprises a proximity sensor, the production cost can be further reduced.

Since the flow passage 11 is formed to be circular in cross section, the frequency of the vibrator 13 can effectively block off the flow of the fluid, ensuring the highly accurate measurement.

Additionally, the flowmeter 10 of the above structure according to this embodiment can also be applied to a Differential Producing flowmeter.

Specifically, a bypass is provided to interconnect the upstream and downstream sides of a proper throttle mechanism disposed midway a main flow passage, and the flowmeter 10 according to this embodiment is disposed in the bypass. A fluid upstream of the throttle mechanism is introduced to flow into the flowmeter 10 according to this embodiment through the opening 46 of the inlet unit 23, and is then discharged to downstream of the throttle mechanism through the opening 47 of the outlet unit 24.

In this case, the flow rate passing through the bypass is In proportion to the flow rate passing through the main flow passage. Therefore, the differential pressure developed across the throttle mechanism in the main flow passage is also in proportion to the differential pressure developed across the flowmeter 10 disposed in the bypass.

While the differential pressure has such a characteristic that the ½ power thereof is proportional to the flow velocity, the flowmeter 10 disposed in the bypass indicates the differential pressure (flow velocity) as the flow rate which is expressed by the number of vibrations, i.e., a linear function. Therefore, the flow rate passing through the main flow passage can be indicated by the number of vibrations.

In the conventional Differential Producing flowmeter, since the flow rate value is indicated by the differential pressure, a calculation circuit is provided to extract the square root of the differential pressure so that the flow rate value is read after conversion into a linear signal. However, when the flowmeter 10 according to this embodiment is disposed in the bypass of the Differential Producing flowmeter as described above, the flow rate value can be directly read as the number of vibrations that corresponds to the square root of the differential pressure.

Also, the conventional Differential Producing flowmeter requires calculations for compensation when conditions such as density, pressure and temperature of the fluid to be measured is varied. By contrast, the flowmeter 10 according to this embodiment requires no calculations for compensation because the number of vibrations is not affected by the density, pressure and temperature of the fluid.

As a result, the calculation circuit which has been installed in the conventional Differential Producing flowmeter is no longer needed in the foregoing embodiment.

In the illustrated embodiment, as described above, the pair of guides 20, 20 are provided in the lower portion of the fluid separator 15 to guide the vibrator 13 from both sides thereof so that the vibrator 13 is reciprocally vibrated in the direction of thickness of the flow separator 15 in the form of a plate and in the direction perpendicular to the flow separating surfaces 57. With this arrangement, even if the pressure acts on the vibrator 13 in an extremely uneven manner depending on the condition of the fluid flowing into the flowmeter, the vibrator 13 can be always vibrated in the certain direction.

The guides are not limited to those shown in the above embodiment, but may be variously modified, by way of example, as shown in FIGS. 3 to 6.

Figure 3:
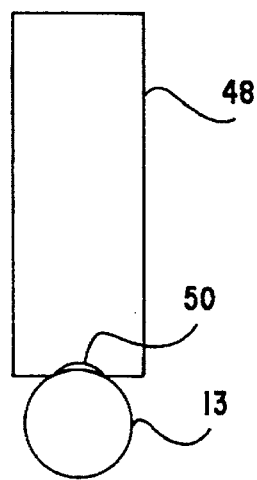
FIG. 3 is a conceptual view showing one embodiment of a guide formed as part of a flow separator used in the flowmeter according to the present invention.
Figure 4:
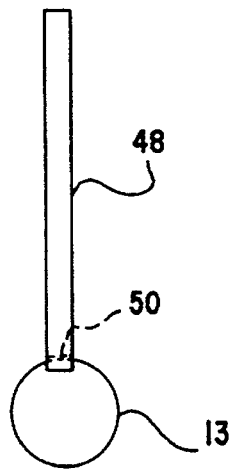
FIG. 4 is a conceptual view showing one embodiment of the guide formed as part of the flow separator used in the flowmeter according to the present invention.

In an example shown in FIGS. 3 and 4, a cutout 50 having a little smaller curvature than that of the spherical vibrator 13 is formed in an upstream end portion of a flow separator 48 in the form of a plate having a predetermined thickness. The cutout 50 serves to restrict the vibrator 13 so as to vibrate in the direction of thickness of the flow separator 48.

Figure 5:
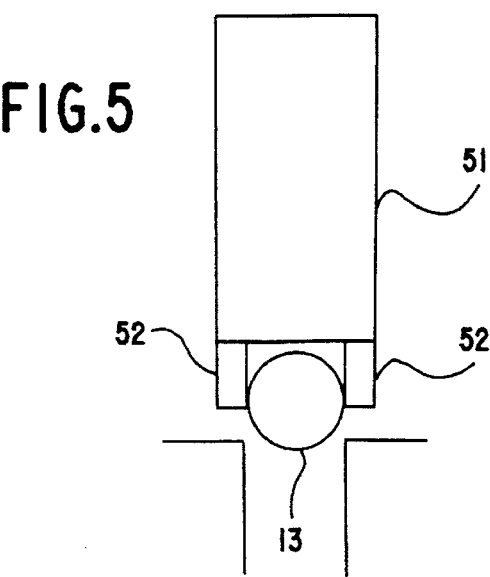
FIG. 5 is a conceptual view showing another embodiment of the guide provided on the flow separator used in the flowmeter according to the present invention.
Figure 6:
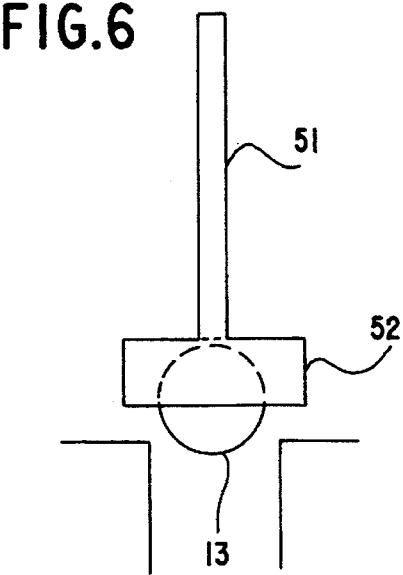
FIG. 6 is a conceptual view showing another embodiment of the guide provided on the flow separator used in the flowmeter according to the present invention.

Alternatively, as shown in FIGS. 5 and 6, a pair of guide pieces 52, 52 each having a predetermined length are attached to opposite sides of an upstream end of a flow separator 51 to extend in a direction of thickness thereof. The pair of guide pieces 52, 52 serve to restrict the vibrator 13 so as to vibrate in the certain direction.

In the latter case of providing the guide pieces 52, 52, it is possible to more positively restrict the vibrating direction of the vibrator 13.

Figure 7:
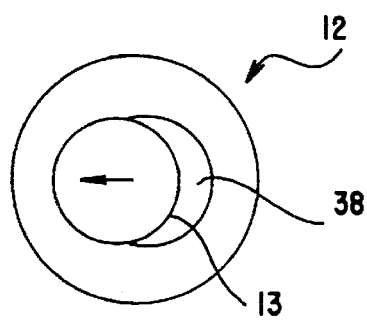
FIG. 7 is a conceptual view showing a cross-sectional shape of a cavity defined inside a measuring unit used in the flowmeter according to the present invention.
Figure 10:
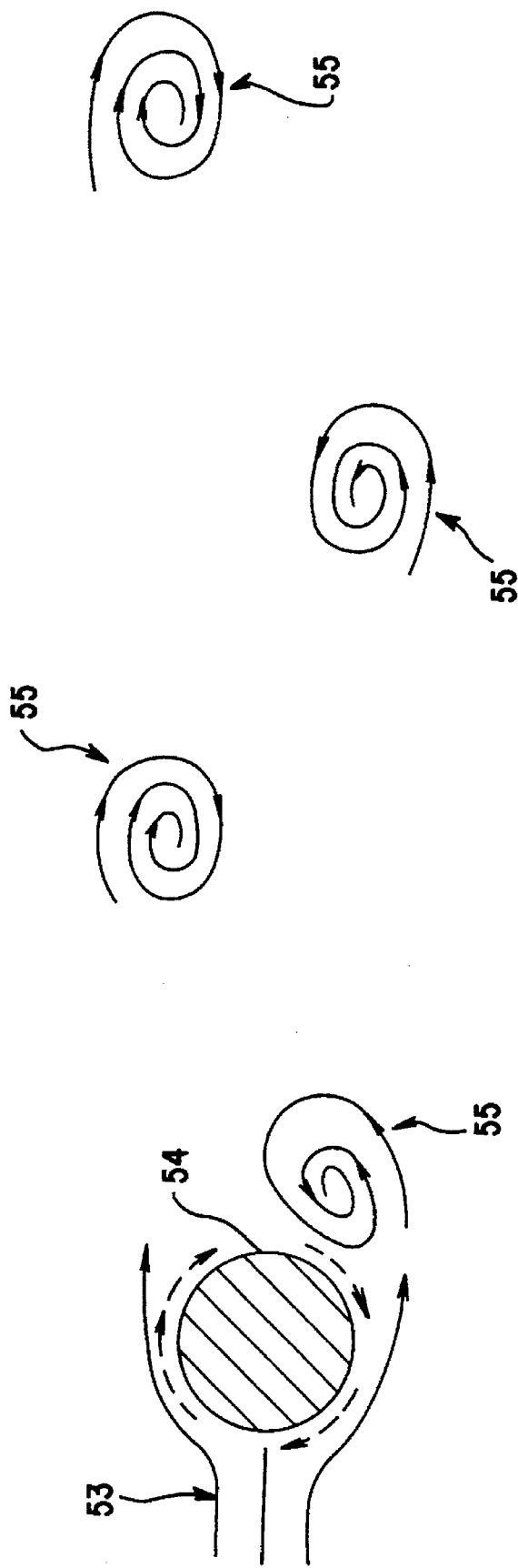
FIG. 10 is an explanatory view showing a state that yon Karman's vortices are generated in a conventional vortex flowmeter.

In the above embodiment, the inlet passage 21 making up part of the flow passage 11 is described as being formed of a cylinder which is truly circular in cross-section. However, the present invention is not limited to such a configuration. As shown in FIG. 7, for example, the inlet passage 21 may be formed of a cylinder which is oblong in cross-section. Alternatively, it may have an elliptical cross-section.

While the vibrator 13 is described as floating in the fluid in the above embodiment, the present invention is not limited to such an arrangement. As shown in FIGS. 8 and 9, for example, the vibrator 13 may be supported by a support which has a supporting force smaller than the force imposed by the flow velocity of the fluid. Preferably, the support comprises a coil spring 56 having a spring constant smaller than the force imposed by the flow velocity of the fluid.

Specifically, a pair of such coil springs 56, 56 are fixed to the inner wall surface 41 of the frequency converter 14 in opposed relation in the direction of thickness of the flow separator 15 and in the direction perpendicular to the flow separating surfaces 57. The pair of coil springs 56, 56 serve to support the vibrator 13 from both sides thereof in the direction of width of the frequency converter 14.

This arrangement makes it possible to control the amplitude of the vibrator 13, and effectively prevent a wear of the vibrator abutting portion 16 which would be otherwise enlarged due to collision forces caused upon the vibrator 13 colliding the vibrator abutting portion 16.

Further, while the vibrator 13 is described as being spherical in the above embodiment, the shape of the vibrator is not limited to illustrated one.

While the frequency detector 17 is described as being formed of a proximity sensor in the above embodiment, the present invention is not limited to the use of a proximity sensor Since the frequency of the vibrator causes pressure frequency simultaneously, a pressure sensor or a differential pressure transmitter, for example, may be used instead.

Since the fluid flowing through the frequency converter 14 passes the pair of cavities 30a, 30b alternately, the number of vibrations can also be detected by using a thermal sensor or the like which is able to measure the amount of heat dissipated when the fluid flows through the cavity 30a or 30b.

While the flowmeter 10 is described as being made of stainless steel in the above embodiment, it may be made of any of various non-corrosive steels or resins so that the flowmeter will not corrode with the fluid flowing therethrough.

The flowmeter 10 according to the above embodiment is applicable to all kinds of fluids such as water, liquid, air and various gases. The flowmeter 10 is subject to limitations from the viscosity, sludge and flow velocity of the fluid to be measured, but not to any limitations from the density, pressure and temperature of the fluid.

Additionally, the flowmeter 10 can be applied to regardless whether the fluid flows in the vertical or horizontal direction, and has no limitations in its posture in use.

Note that the embodiments of the present invention as set forth above have been given by way of example only and are not to be taken in a limiting sense. The scope of the invention is defined in the claims and modifications falling within the scope of the claims are all involved in the invention.

What is claimed is:

1. A flowmeter comprising a flow passage through which a fluid to be measured flows, and a measuring unit disposed in said flow passage for measuring the flow rate of the fluid, said measuring unit comprising:

a vibrator positioned in the fluid flowing into said measuring unit and being able to reciprocally vibrate in a direction of width of said flow passage when there occurs a differential pressure due to a flow velocity;

a flow separator disposed downstream of said vibrator to abut with said vibrator for holding said vibrator in said measuring unit and also separating the fluid, and forming a frequency converter capable of supplying the pressure of the fluid to said vibrator from the upstream side so that said vibrator can reciprocally vibrate;

a vibrator abutting portion disposed upstream of said vibrator and coming into abutment with said vibrator when said vibrator is vibrated; and a frequency detector capable of detecting reciprocal frequency of said vibrator, said flow separator having a first surface and a second surface opposite said first surface and being disposed to divide the interior of said measuring unit for defining a pair of cavities side by side in the direction of width of said flow passage, wherein one of said pair of cavities is defined within said first surface of said flow separator and an inner surface portion of said measuring unit, wherein another one of said pair of cavities is defined within said second surface of said flow separator and another inner surface portion of said measuring unit, said pair of cavities making up said frequency converter, said vibrator being reciprocally vibrated upstream between said pair of cavities in the direction of width of said flow passage, the reciprocal frequency of said vibrator being detected by said frequency detector to detect the flow rate of the fluid.

2. A flowmeter according to claim 1, wherein said vibrator is formed to be spherical.

3. A flowmeter according to claim 1, wherein said flow separator has a guide for restricting the reciprocal frequency of said vibrator in the direction of width of said flow passage to a certain direction.

4. A flowmeter according to claim 1, wherein said measuring unit comprises a measuring unit body and an inlet passage through which the fluid flows into said measuring unit body, said inlet passage is formed to have a smaller diameter than that of a cavity defined in said measuring unit body, and said vibrator abutting portion is formed by an edge of an inner circumferential surface defining said inlet passage through which the fluid flows into said measuring unit body.

5. A flowmeter according to claim 1, wherein said vibrator is formed to have a diameter not only larger than a spacing between said flow separator and the inner circumferential surface of said flow passage in said measuring unit, but also larger than an inner diameter of said inlet passage.

6. A flowmeter according to claim 1, wherein said flow separator is formed of a plate-like member and is disposed to extend in a direction of flow of the fluid such that said flow passage is almost evenly divided into two parts in the direction of width of said flow passage, and said vibrator is arranged to reciprocally vibrate in a direction of thickness of said plate-like member.

7. A flowmeter according to claim 1, wherein said frequency detector comprises a proximity sensor.

8. A flowmeter according to claim 1, wherein said flow passage is formed to be circular in cross-section.

9. A flowmeter according to claim 1, wherein said vibrator is supported by a support which has a supporting force smaller than the force imposed by the flow velocity of the fluid.

10. A flowmeter adapted for a structure, comprising: a main flow passage through which a fluid to be measured flows; a throttle mechanism disposed in said main flow passage; and a bypass for communicating the upstream and downstream sides of said throttle mechanism with each other, said flowmeter being disposed in said bypass and having a measuring section for measuring the differential pressure across said throttle mechanism, to thereby measure the flow rate of the fluid, said measuring section including a measuring unit into which the fluid upstream of said throttle mechanism is introduced for measuring the flow rate of the fluid, wherein said measuring unit comprises:

a vibrator positioned in the fluid flowing into said measuring unit and being able to reciprocally vibrate in a direction of width of said flow passage when there occurs a differential pressure due to a flow velocity, a flow separator disposed downstream of said vibrator to abut with said vibrator for holding said vibrator in said measuring unit and also separating the fluid, and forming a frequency converter capable of supplying the differential pressure generated by a throttle in said main flow passage to said vibrator from the upstream side so that said vibrator can reciprocally vibrate, a vibrator abutting portion disposed upstream of said vibrator and coming into abutment with said vibrator when said vibrator is vibrated, and a frequency detector capable of detecting reciprocal frequency of said vibrator, said flow separator having a first surface and a second surface opposite said first surface and being disposed to divide the interior of said measuring unit for defining a pair of cavities side by side in the direction of width of said flow passage, wherein one of said pair of cavities is defined within said first surface of said flow separator and an inner surface portion of said measuring unit, wherein another one of said pair of cavities is defined within said second surface of said flow separator and another inner surface portion of said measuring unit, said pair of cavities making up said frequency converter, said vibrator being reciprocally vibrated upstream between said pair of cavities in the direction of width of said flow passage, the reciprocal frequency of said vibrator being detected by said frequency detector to detect the flow rate of the fluid.

* * * * *